Figure 1:
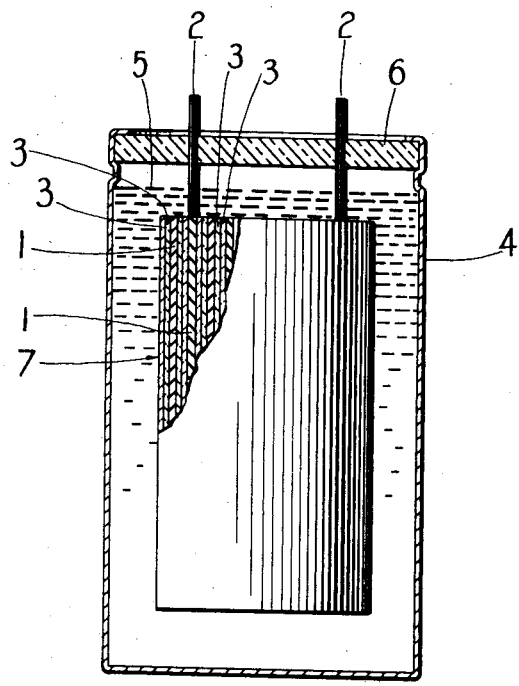

Jan. 22, 1935.　　　　P. ROBINSON　　　　1,989,046
ELECTRICAL CONDENSER
Filed Sept. 20, 1933

PRESTON ROBINSON
INVENTOR

BY *Dorsey & Cole*
ATTORNEYS

Patented Jan. 22, 1935

1,989,046

UNITED STATES PATENT OFFICE

1,989,046

ELECTRICAL CONDENSER

Preston Robinson, North Adams, Mass., assignor to Sprague Specialties Company, North Adams, Mass., a corporation of Massachusetts Application September 20, 1933, Serial No. 690,275

6 Claims. (Cl. 175—41)

The present invention relates to electrical condensers comprising metallic plate or foil electrodes and interposed layers of paper, textile or similar absorbent dielectric material, which layers are impregnated with a suitable impregnating medium.

While I shall refer hereafter to condensers using paper layers, it should be well understood that the present invention applies equally well to condensers using instead of paper, interposed layers of cloth, "Cellophane", etc.

The impregnating compound used for the impregnation of these condensers has to meet several requirements. Among these are high dielectric constant, small electric dipole-moment, high stability, etc., and also in many instances mobility and good heat transferring properties.

The impregnating media usually employed fall into two general groups. The first group comprises impregnating media which are substantially solid at the operating temperatures of the condenser, for instance, paraffin, halowax, sulphur, etc. these being generally referred to as waxes, and the second group comprises those which are fluid or mobile at the operating temperatures of the condenser, these being generally referred to as oils.

Condensers have also been suggested in which a double impregnation of the condenser, or its impregnation with a mixture of two media takes place. In such cases one of the two has been a wax and the other an oil; the purpose of such double impregnation or impregnation with a mixture of impregnating media has been to combine desired characteristics which could not be found in a single impregnating medium, but each of which is present in one or the other medium of the combination, and it was believed that with such a combination the desirable properties of the two individual impregnating media will manifest themselves. Generally the wax was selected for its high dielectric constant and stability, and oil on account of its mobility, to prevent air-pockets in the condenser and for cooling purposes.

However, it has been found that the resulting condensers, instead of combining the advantageous properties of the individual impregnating media, possessed as a rule the drawbacks thereof. For instance, when halowax and oil were used to obtain the high dielectric constant of the halowax and take advantage of the mobility of the oil to avoid air-pockets, the resultant condenser had a capacity corresponding to the low dielectric constant of the oil and the halowax, and the oil mixed, resulting in a more or less viscous medium which tended to bleed out from the condenser roll without removing the danger of air-pockets.

I have found that the desirable properties of two impregnating media can be successfully combined and their undesirable properties suppressed, by using instead of a solid and a fluid impregnating medium, two media both of which have considerable fluidity, and hereafter referred to as oils. One of the selected oils has a high dielectric constant, small electric dipole, and serves as the impregnating medium proper, whereas the second oil serves for protection and cooling and has high stability and other characteristics later to be specified.

The oils or liquid impregnating media which seem the most suitable on account of their high dielectric constant and small electric-dipole, unfortunately, as a rule, possess other qualities which render them less suitable or entirely unsuitable as impregnating media for condensers.

For instance, castor-oil, which has a comparatively high dielectric constant, has the known drawback of rapidly oxidizing in air; this manifests itself as a process of auto-oxidation, which is characterized first by a relatively slow oxidation, which after it has proceeded to a certain point, is followed by an extremely rapid oxidation. The resultant oxidation products, acids and water, are highly injurious to electrical condensers and consequently the castor-oil condensers of the prior art showed first a gradual and slow, and then a very rapid deterioration.

Nitro-benzene, which is another oil having a high dielectric constant, is objectionable because it gives off poisonous fumes. Again, other fluid impregnating media having high dielectric constants, like chlorinated diphenyl, are expensive.

According to my invention all of these oils can be used as the impregnating medium proper without drawback, by immersing the condensers impregnated with same in a second oil, which has high stability, high flash point, high boiling point, and which does not give up objectionable gases, is chemically and otherwise neutral, and is comparatively low-priced. Various purified mineral oils as used in transformers and cables are well suited for this purpose. This second oil protectively surrounds the impregnated condenser and thus prevents the oxidation of castor-oil or the giving off of poisonous fumes by nitro-benzene. My invention can also be advantageously used with expensive impregnating oils like chlorinated diphenyl, because only small quantities of this oil are required for the impregnation proper, and for the protection and the cooling, which require large quantities of oil, the less expensive mineral oils can be used.

In view of the previous failures, experienced in cases where wax and oil were used in combination, due to the intermixture of the two media and the partial substitution in the paper of the wax by the oil, it would first appear that the use of two oils in the manner above set forth cannot produce satisfactory results, as thus it could be expected that the two oils would gradually mix and that the impregnating oil would be gradually substituted by the outer oil, thus reducing the effective dielectric constant; and also that the impregnating oil would gradually find its way to the air-exposed surface of the condenser and be subject to oxidation, or give off objectionable fumes, etc.

I have found the rather surprising fact that this intermixture of the oils does not take place or at least only to an insignificant extent. The reason for this unexpected behavior of the two oils under these conditions is not fully known to me, but it would seem that the impregnating oil reacts with the absorbent material (paper or the like) and forms therewith a loosely held compound. Such absorption compounds, the behavior of which is not yet fully explained, seem to be held together primarily by the surface forces.

In preliminary experiments I have found that if a sheet of paper is impregnated in castor oil and then the impregnated sheet is dipped in mineral oil, the castor oil will not be displaced from its combination with the paper if the oil is subjected to a strong agitation, and only if such agitation is maintained for a long period of time, a condition which does not occur in the normal operation of such condensers.

When condensers made according to the invention are placed in operation, the above referred to phenomenon is still more pronounced, which could be explained by the electric field strengthening the absorption forces which hold together the impregnating oil and the paper.

Irrespective of whether or not my above assumptions explain the phenomenon, the results obtained in experiments and in the production of condensers using this process definitively prove that no substitution or mixing of the oil takes place.

For instance, in taking a large number of condenser rolls, which are identical in every respect, and impregnating one batch thereof in castor oil and a second batch in mineral oil, the condensers of the first batch gave an average capacity of 3.5 microfarads and the condensers of the second batch an average capacity of 2.8 microfarads.

If condensers of the first batch were subsequently immersed in a bath of mineral oil, their capacity did not change in the least, even in the course of extended life tests and even under conditions which were more conducive to the intermixture of the oils than those which might occur in normal operation.

Condensers manufactured according to my novel process retain the inherent advantages of the impregnating oil without manifesting their drawback. For instance, while condensers which are impregnated only in castor-oil, when subjected to accelerated life test at about five times their rated voltage, showed a life of 50 to 80 hours, similarly impregnated condensers when immersed in a suitable mineral oil and under the same test conditions, showed a life well in excess of 500 hours.

In the drawing forming part of this specification:

Figure 1 is a side view partly in cross-section of a condenser embodying my invention.

The condenser consists of two electrode foils 1—1, of tin, aluminum or like material, each electrode being provided with a connecting lead 2—2 for the outside connection of the condenser. Between the foils 1—1 are interposed one or more layers 3—3 of paper or other porous dielectric material. The metal foils and paper layers are wound into a roll and then subjected to impregnation with the impregnating oil 7.

This impregnation preferably takes place under heat and under vacuum in well-known manner. As the impregnating oil, an oil of high dielectric constant and low electric dipole-moment, is selected. Such impregnating oil may be, for instance, castor-oil, nitro-benzene, chlorinated diphenyl. The mentioned oils have all a high dielectric constant and low electric dipole-moment. For condensers used in alternating current work I prefer to use castor-oil or chlorinated diphenyl, whereas for direct or rectified current use nitro-benzene is highly suitable.

After the condensers have been properly impregnated in one of the above-mentioned impregnating oils or an oil of similar characteristics, they are placed in a container 4, which contains a quantity of suitable mineral oil 5, having great stability, high flash and boiling points, and is chemically and otherwise neutral. The amount of mineral oil used should be such that it amply covers the condenser but leaves sufficient space for possible expansion of the oil.

The oil-impregnated roll is surrounded thus by the oil 5 and the container is preferably provided with a cover 6 which is shown as being of insulating material through which project the leads 2—2.

The container 4 as a rule is of metal and if desired one of the condenser leads 2 instead of being carried through the insulating cover 6 may be electrically connected to the container 4 which then forms the second terminal of the condenser. However, as a rule it is preferable to electrically insulate the condenser from the container, especially for higher voltages, in which case the good insulating properties of the oil are also utilized.

The condenser made in accordance with the above will show a high capacity corresponding to the high dielectric constant of the impregnating oil, while such objectionable properties, as the oxidation of castor-oil or the giving off of poisonous fumes by nitro-benzene, due to the protection of the surrounding mineral oil are entirely eliminated.

Nor is it necessary to air-tightly seal the container, which eliminates the necessity of expensive constructions.

The surrounding mineral oil acts not only as a protecting jacket for the impregnated condensers, but also provides for an efficient heat transfer from the condenser to the outside and thus the condensers are efficiently cooled during the operation.

Such condensers have excellent all round characteristics which they retain for practically unlimited time.

While I have described my invention in connection with a specific example and specific impregnating materials, I do not wish to be limited to same, but desire the appended claims to be construed as broadly as permissible in view of the prior art.

What I now claim as new and desire to secure by Letters Patent is:

1. An electrical condenser comprising an assembly, including electrodes and interposed absorbent dielectric layers impregnated with an oil having a high dielectric constant, and a second oil which is chemically neutral and has high stability, surrounding said assembly.

2. An electrical condenser comprising a container, and a condenser body including electrodes and interposed absorbent dielectric layers impregnated with an oil having highly favorable dielectric properties, but being unstable when in contact with air, and a second oil in said container, said second oil having high stability, said body being submerged in said second oil.

3. An electrical condenser comprising an assembly including electrodes and interposed absorbent dielectric layers impregnated with an oil having a high dielectric constant, and a stable mineral oil in which said assembly is submerged.

4. An electrical condenser comprising a condenser assembly including electrodes and interposed absorbent dielectric layers impregnated with castor oil, and a second oil of great stability surrounding said impregnated assembly.

5. An electrical condenser comprising an assembly including electrodes and interposed absorbent dielectric layers impregnated with nitrobenzene, and a second oil of great stability surrounding said assembly.

6. An electrical condenser comprising an assembly including electrodes and interposed absorbent dielectric layers impregnated with a chlorinated diphenyl, and a second oil of great stability surrounding said assembly.

PRESTON ROBINSON.